United States Patent [19]

Iwata et al.

[11] Patent Number: 4,932,726
[45] Date of Patent: Jun. 12, 1990

[54] ANTI-SKID BRAKE CONTROL SYSTEM WITH VEHICLE SPEED DEPENDENT VARIABLE SLIPPAGE THRESHOLD FEATURE

[75] Inventors: Kazuroh Iwata; Eiji Yagi; Hirotsugu Yamaguchi; Sunao Hano, all of Kanagawa, Japan

[73] Assignee: Nissan Motor Company, Limited, Yokohama, Japan

[21] Appl. No.: 93,192

[22] Filed: Sep. 4, 1987

[30] Foreign Application Priority Data

Sep. 6, 1986 [JP] Japan .................................. 61-210357

[51] Int. Cl.$^5$ ................................................ B60T 8/58
[52] U.S. Cl. .................... 303/100; 188/181 A; 303/102; 303/109; 303/105; 303/106; 364/426.02
[58] Field of Search ................... 188/181 A; 364/426, 364/426.01, 426.02; 303/93, 95, 97, 102, 103, 105, 106, 109, 115, 100

[56] References Cited

U.S. PATENT DOCUMENTS

| | | | |
|---|---|---|---|
| 3,515,440 | 6/1970 | Every et al. ............... | 188/181 A |
| 3,586,387 | 6/1971 | Riordan et al. .................. | 303/109 |
| 3,701,568 | 10/1972 | Lewis et al. ................... | 303/106 |
| 3,870,376 | 3/1975 | Riordan ........................ | 303/92 |
| 3,883,186 | 5/1975 | Rodi . | |
| 4,000,928 | 1/1977 | Takeuchi et al. ............... | 303/106 X |
| 4,285,042 | 8/1981 | Ohmori et al. . | |
| 4,404,633 | 9/1983 | Goicoechea ...................... | 303/93 |
| 4,408,290 | 10/1983 | Kubo et al. ...................... | 364/566 |
| 4,430,714 | 2/1984 | Matsuda et al. .............. | 303/100 X |
| 4,446,522 | 5/1984 | Sato et al. ..................... | 303/106 X |
| 4,558,414 | 12/1985 | Sakakiyama ..................... | 180/197 |
| 4,569,560 | 2/1986 | Kubo ........................... | 303/97 X |
| 4,597,052 | 6/1986 | Matsuda ......................... | 364/550 |
| 4,651,281 | 3/1987 | Masaki et al. ................. | 303/103 X |
| 4,656,588 | 4/1987 | Kubo ............................ | 364/426 |
| 4,660,146 | 4/1987 | Kubo ............................ | 364/426 |
| 4,662,686 | 5/1987 | Matsuda ......................... | 303/106 |
| 4,663,715 | 5/1987 | Kubo ............................ | 303/105 X |
| 4,663,716 | 5/1987 | Kubo ............................ | 364/426 |
| 4,665,491 | 5/1987 | Kubo ............................ | 364/424 |
| 4,667,176 | 5/1987 | Matsuda . | |
| 4,669,045 | 5/1987 | Kubo ............................ | 364/426 |
| 4,669,046 | 5/1987 | Kubo ............................ | 364/426 |
| 4,674,049 | 6/1987 | Kubo ............................ | 364/426 |
| 4,674,050 | 6/1987 | Kubo ............................ | 364/426 |
| 4,679,146 | 7/1987 | Kubo ............................ | 364/426 |
| 4,680,713 | 7/1987 | Kubo ............................ | 364/426 |
| 4,680,714 | 7/1987 | Kubo ............................ | 364/426 |
| 4,682,295 | 7/1987 | Kubo ............................ | 303/95 X |
| 4,683,537 | 7/1987 | Matsuda ......................... | 303/95 |
| 4,714,296 | 12/1987 | Imoto et al. .................. | 303/115 X |
| 4,758,053 | 7/1988 | Yasuno ........................... | 303/100 |

FOREIGN PATENT DOCUMENTS 2263284 7/1974 Fed. Rep. of Germany .
2928199 1/1980 Fed. Rep. of Germany .

OTHER PUBLICATIONS

Bosch Technische Berichte, Bd. 7 (1980), H.2, pp. 78–83, 85–89.

Primary Examiner—Douglas C. Butler
Attorney, Agent, or Firm—Foley & Lardner, Schwartz, Jeffery, Schwaab, Mack, Blumenthal & Evans

[57] ABSTRACT

An anti-skid brake control system is capable of optimizing vehicular braking characteristics in order to minimize the braking distance. The anti-skid brake control system takes a feature of the vehicle speed dependent wheel slippage threshold. For this, the anti-skid brake control system of the invention employs a wheel slippage threshold deriving means which derives a wheel slippage threshold on the basis of a vehicle speed. The wheel slippage threshold is compared with an actual wheel slippage detected on the basis of a vehicle speed and a wheel speed. Brake pressure in a wheel cylinder is reduced when the detected wheel slippage is increased across the wheel slippage threshold.

15 Claims, 5 Drawing Sheets

ANTI-SKID BRAKE CONTROL SYSTEM WITH VEHICLE SPEED DEPENDENT VARIABLE SLIPPAGE THRESHOLD FEATURE

BACKGROUND OF THE INVENTION

1. Field of the Invention

The present invention relates generally to an anti-skid brake control system for an automotive vehicle. More specifically, the invention relates to an anti-skid brake control system which has variable brake control characteristics depending upon the vehicle speed. Further, particularly, the invention relates to an automotive anti-skid brake control system which has a vehicle speed dependent slippage threshold feature.

2. Description of the Background Art

The Japanese Patent First Publication (Tokkai) Showa 56-79043 discloses an anti-skid brake control system.

In general, wheel slippage is taken as a criterion for reducing hydraulic brake pressure in a wheel cylinder for preventing vehicular wheels from skidding. It is well known that an optimum braking performance can be obtained by maintaining the wheel slippage at about 15% to 25%. Therefore, it is a conventional technique to set a wheel slippage threshold at the aforementioned range to reduce the brake pressure when the wheel slippage exceeds the set wheel slippage threshold.

Such a conventional process is generally successful in preventing the vehicular wheel from skidding. However, it has been found that optimum wheel slippage at which the optimum braking performance can be obtained is variable depending upon the vehicle speed. That is, when the vehicle speed is relatively low, such as below 40 km/h, the optimum braking performance can be obtained at a wheel slippage of about 25%. On the other hand, when the vehicular speed is relatively high, such as higher than 40 km/h, the wheel slippage at which the optimum braking performance can be obtained, is lowered. Such variation of the wheel slippage at which the optimum braking performance can be obtained, is considered to be caused by hysteresis of the elastic components, such as rubber bushing, damping characteristics of dampers in the suspension system and so forth.

SUMMARY OF THE INVENTION

Therefore, it is an object of the present invention to provide an anti-skid brake control system which can optimize vehicular braking characteristics to minimize the braking distance.

In order to accomplish the aforementioned and other objects, an anti-skid brake control system, according to the invention, takes a feature of vehicle speed dependent wheel slippage threshold. For this, the anti-skid brake control system of the invention employs a wheel slippage threshold deriving means which derives a wheel slippage threshold on the basis of a vehicle speed. The wheel slippage threshold is compared with an actual wheel slippage detected on the basis of a vehicle speed and a wheel speed. Brake pressure in a wheel cylinder is reduced when the detected wheel slippage is increased across the wheel slippage threshold.

According to one aspect of the invention, an anti-skid brake control system comprises a hydraulic brake circuit including a brake pressure source and a wheel cylinder to apply a hydraulic brake pressure for decelerating a wheel rotation, the brake circuit including a pressure control valve means having a variable of valve position at least between a first position, in which brake pressure is increased essentially according to increasing of the fluids pressure in the brake pressure source, and a second position, in which brake pressure is decreased, a first sensor means for monitoring a rotation speed of the wheel to produce a wheel speed indicative sensor signal, a second sensor means for monitoring a speed of a vehicle to produce a vehicle speed indicative sensor signal, third means for deriving a wheel slippage threshold which is variable depending upon the vehicle speed indicative sensor signal value, and fourth means for deriving an actual wheel slippage indicative value on the basis of the vehicle speed indicative sensor signal value and the wheel speed indicative sensor signal value, the fourth means comparing the derived wheel slippage indicative value with the wheel slippage threshold for deriving a control signal for operating the pressure control valve at the first position when the derived wheel slippage indicative value is smaller than or equal to the wheel slippage threshold and at the second position when the derived wheel slippage indicative value is greater than the wheel slippage threshold.

According to another aspect of the invention, an anti-skid brake control system for an automotive brake system comprises a hydraulic brake circuit including a brake pressure source and a wheel cylinder to apply a hydraulic brake pressure for decelerating a wheel rotation, the brake circuit including a pressure control valve means having a variable valve position at least between a first position, in which brake pressure is increased essentially according to increasing of the fluids pressure in the brake pressure source, a second position, in which brake pressure is decreased and a third position, in which brake pressure in the wheel cylinder is held constant, a first sensor means for monitoring a rotation speed of the wheel to produce a wheel speed indicative sensor signal, a second sensor means for monitoring a speed of a vehicle to produce a vehicle speed indicative sensor signal, third means for deriving a wheel slippage threshold which is variable depending upon the vehicle speed indicative sensor signal value, and fourth means for deriving an actual wheel slippage indicative value on the basis of the vehicle speed indicative sensor signal value and the wheel speed indicative sensor signal value, and deriving a wheel acceleration value on the basis of the wheel speed indicative sensor signal value, the fourth means deriving position of the pressure control value on the basis of the wheel slippage indicative value and the wheel acceleration value, the fourth means deriving a control signal ordering the mode for operating the pressure control valve to the first position, position when the derived wheel slippage indicative value is smaller than or equal to the wheel slippage threshold and the wheel acceleration is held within a given range defined by a lower criterion and an upper criterion, a second mode for operating the pressure control valve at the second position when the derived wheel slippage indicative value is greater than the wheel slippage threshold, and a third mode for operating the pressure control valve at the third position when the derived wheel slippage indicative value is smaller than or equal to the wheel slippage threshold and the wheel acceleration is out of the given range.

The third means compares the vehicle speed indicative sensor signal value with a predetermined vehicle speed threshold to vary the wheel slippage threshold at a first value when the vehicle speed indicative sensor signal value is smaller than or equal to the vehicle speed threshold and at a second value when the vehicle speed indicative sensor signal value is greater than the vehicle speed threshold.

The first value represents a greater wheel slippage criterion than that represented by the second value. In practice, the first value and the second value may be different types of values. For instance, the first value is a wheel slip rate and the second value is a wheel slip speed.

In addition, the hydraulic circuit further includes a proportioning valve interposed between the pressure control valve and the wheel cylinder.

In the preferred construction, the anti-skid brake control system comprise a plurality of mutually independent hydraulic circuits, each being connected to the brake pressure source and having the wheel cylinder and the pressure control valve, a plurality of the first sensor means for monitoring rotation speeds respectively corresponding wheels, and the fourth means performing anti-skid brake control by controlling valve positions of respective pressure control valves independently of each other. In this case, at least one of hydraulic circuit is connected to wheel cylinders for applying braking pressure for rear wheels, and which further comprises a proportioning valve disposed within the hydraulic circuit connected to wheel cylinders of the rear wheels.

DESCRIPTION OF THE PREFERRED EMBODIMENT

Figure 1:
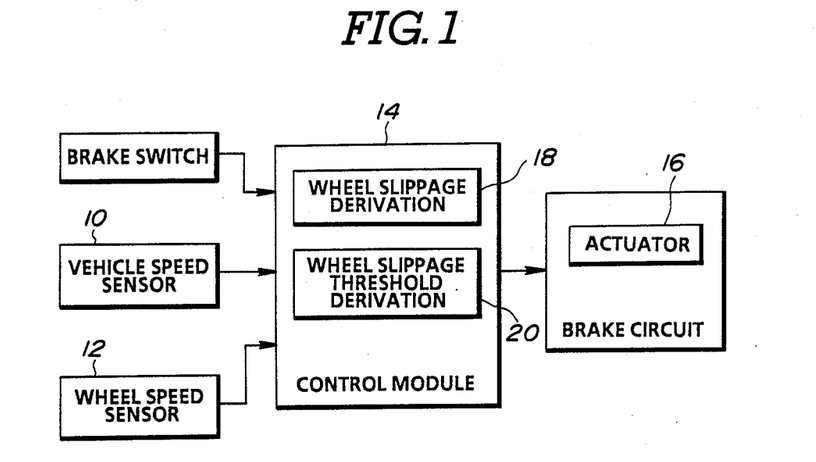
FIG. 1 is a schematic block diagram showing the principle of an anti-skid brake control system, according to the invention.

Referring now to the drawings, particularly to FIG. 1, an anti-skid brake control system according to the present invention is schematically illustrated in a manner high-lighting the principle of the present invention. As will be seen from FIG. 1, the anti-skid control system includes a vehicle speed sensor means 10 which monitors a vehicle speed Vc and produces a vehicle speed indicative signal. The anti-skid brake control system of FIG. 1 also includes a wheel speed sensor means 12 which monitors a rotation Vw of a vehicular wheel and produces a wheel speed indicative signal. The vehicle speed indicative signal may be a signal representative of a vehicle speed factor which can be compared with the wheel speed indicative signal value. Though it is not clearly shown in FIG. 1, the actually constructed anti-skid brake control system also includes a brake sensor means for detecting vehicular braking state to produce a braking state indicative signal when a brake pedal is depressed. Other control parameters, such as vehicular steering angle sensor, can be additionally taken to perform anti-skid control more precisely adapted to the vehicle driving condition, if necessary.

The vehicle speed indicative signal and the wheel speed indicative signal are fed to a control module 14. The control module 14 is connected to a brake control actuator 16 which is designed for controlling the valve position of a pressure control valve in a hydraulic brake circuit. In practice, the control module 14 operates the actuator to an APPLICATION mode position to increase a hydraulic brake pressure in a wheel cylinder (not shown) according to increasing of the braking pressure in the hydraulic brake circuit, a HOLD mode position in which the hydraulic brake pressure in the wheel cylinder is held constant, and a RELEASE mode position in which the hydraulic brake pressure in the wheel cylinder is reduced. The control module 14 outputs an anti-skid control signal according to a predetermined schedule to operate the actuator 16 at one of the APPLICATION, HOLD and RELEASE mode positions depending upon the vehicular braking condition. The control module 14 includes a stage 16 for deriving a wheel slippage threshold $\lambda_{ref}$ on the basis of the vehicle speed indicative signal value Vc. The control module 14 also has a stage 18 for detecting an actual wheel slippage $\lambda$ on the basis of vehicle speed indicative signal value Vc and the wheel speed indicative signal value Vw. The wheel slippage threshold $\lambda_{ref}$ serves as a criterion for switching operation mode into the RELEASE mode position. Namely, the actual wheel slippage $\lambda$ as detected at the wheel slippage detecting stage 18 is compared with the wheel slippage threshold $\lambda_{ref}$ so that the control signal ordering the RELEASE mode is output when the actual wheel slippage is greater than or equal to the wheel slippage threshold. By cyclically putting the actuator into the APPLICATION mode position, HOLD mode position and RELEASE mode position in order, the wheel slippage can be adjusted toward the wheel slippage threshold, at which the optimum braking performance can be obtained.

Figure 2:
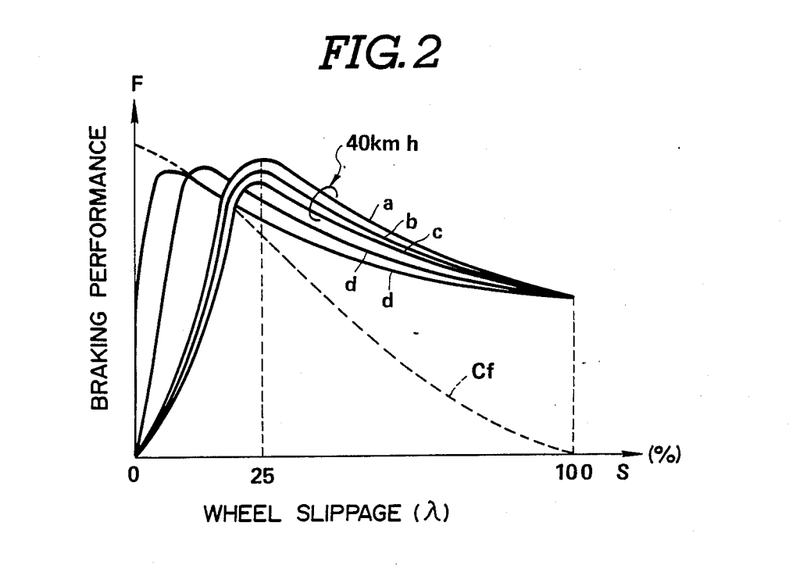
FIG. 2 is a graph showing a variation of the braking performance in relation to the vehicle speed and the wheel slippage.

As seen from FIG. 2, the wheel slippage to obtain the optimum braking performance is variable depending upon the vehicle speed Vc. For instance, when the vehicle speed Vc is 40 km/h, the optimum braking performance can be obtained at the wheel slippage of 25%, as will be seen from the upper three curves a, b and c in FIG. 2. Whereas, as seen from the lower two curves d and e which illustrate braking performance from the vehicular speed Vc higher than 40 km/h, the optimum braking performance or efficiency can be obtained at substantially lower wheel slippage, e.g. 10% to 15%.

It will be appreciated from FIG. 2, that the maximum cornering force CF may be obtained at wheel slippage of 0%. Therefore, when purely considering the cornering force, a braking condition with no wheel slip is the most preferable condition.

As set forth, the anti-skid brake control system according to the present invention, employs the wheel slippage threshold deriving stage for deriving the wheel slippage threshold $\lambda_{ref}$ on the basis of the vehicle speed Vc. This can maintain the braking performance or efficiency to be precisely adapted to the vehicular driving condition to optimize the vehicular braking characteristics.

The preferred embodiment of the anti-skid brake control system which implements the present invention will be described in detail with reference to FIGS. 3 to 6.

Figure 3:
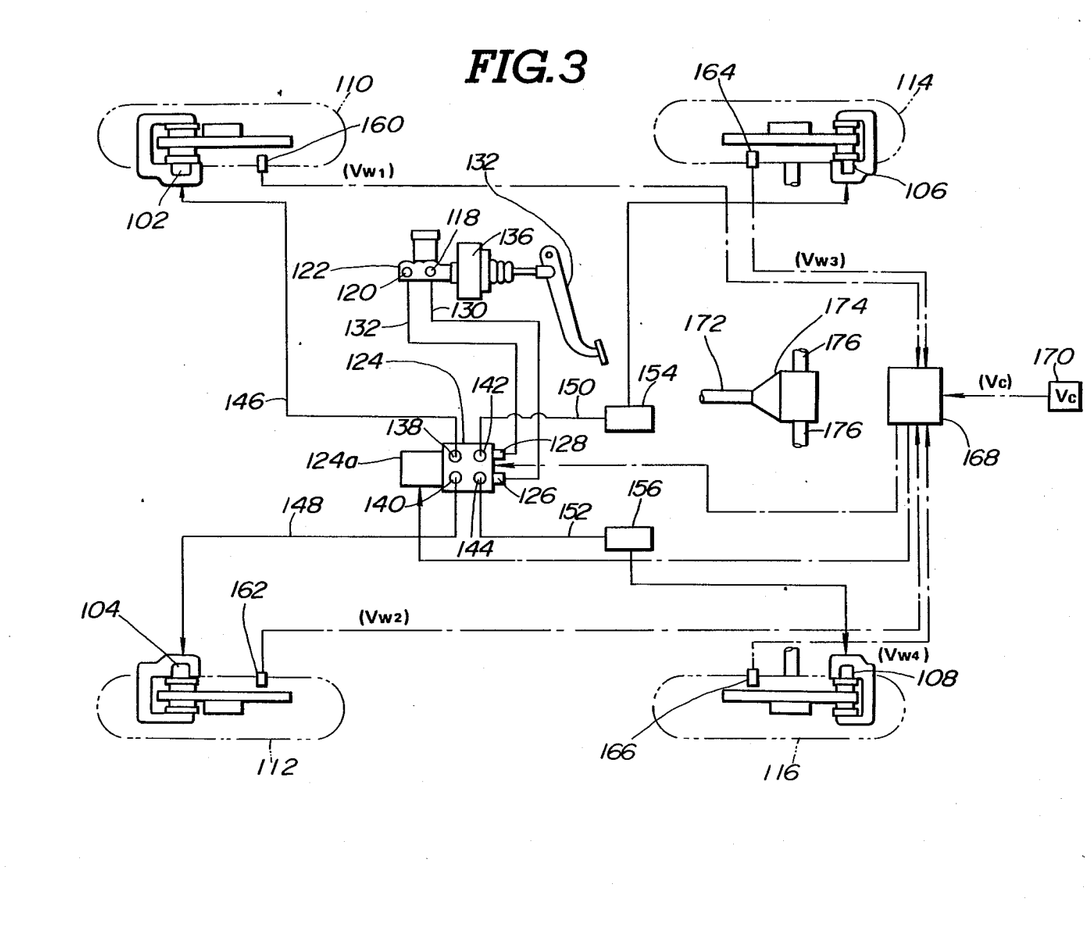
FIG. 3 is a diagram showing the detailed construction of the preferred embodiment of the anti-skid brake control system according to the invention.

FIG. 3 shows the preferred embodiment of the anti-skid brake control system according to the present invention. The shown embodiment of the anti-skid brake control system is applied for a hydraulic automotive brake system including wheel cylinders 102, 104, 106 and 108 which are provided for the respective front and rear wheels 110, 112, 114 and 116. The wheel cylinders 102, 104, 106 and 108 are connected to primary and secondary outlet ports 118 and 120 of a master cylinder 122 via a pressure control valve unit 124. The pressure control valve unit 124 has a pair of inlet ports 126 and 128 connected to the primary and secondary outlet ports 118 and 120 of the master cylinder 122 via pressure lines 130 and 132 to receive therethrough a hydraulic brake pressure built-up in the master cylinder in response to depression of a brake pedal 134, the braking force of which is input to the master cylinder via a brake booster 136. On the other hand, the pressure control valve unit 124 has four ports 138, 140, 142 and 144 respectively connected to the wheel cylinders 102, 104, 106 and 108 via pressure lines 146, 148, 150 and 152. Proportioning valve units 154 and 156 are disposed in the pressure lines 150 and 152 for the rear wheel cylinders 106 and 108.

The proportioning valves 154 and 156 are designed to be responsive to the hydraulic pressure to restricting the working fluid to flow therethrough and thereby prevent the rear wheels 114 and 116 from skidding at earlier timing than that of the front wheels. The various known constructions of the proportioning valves are applicable for the shown embodiment of the hydraulic brake circuit. Since the proportioning valves 154 and 156 are of per se known constructions they do not need to be described in detail.

Figure 4:
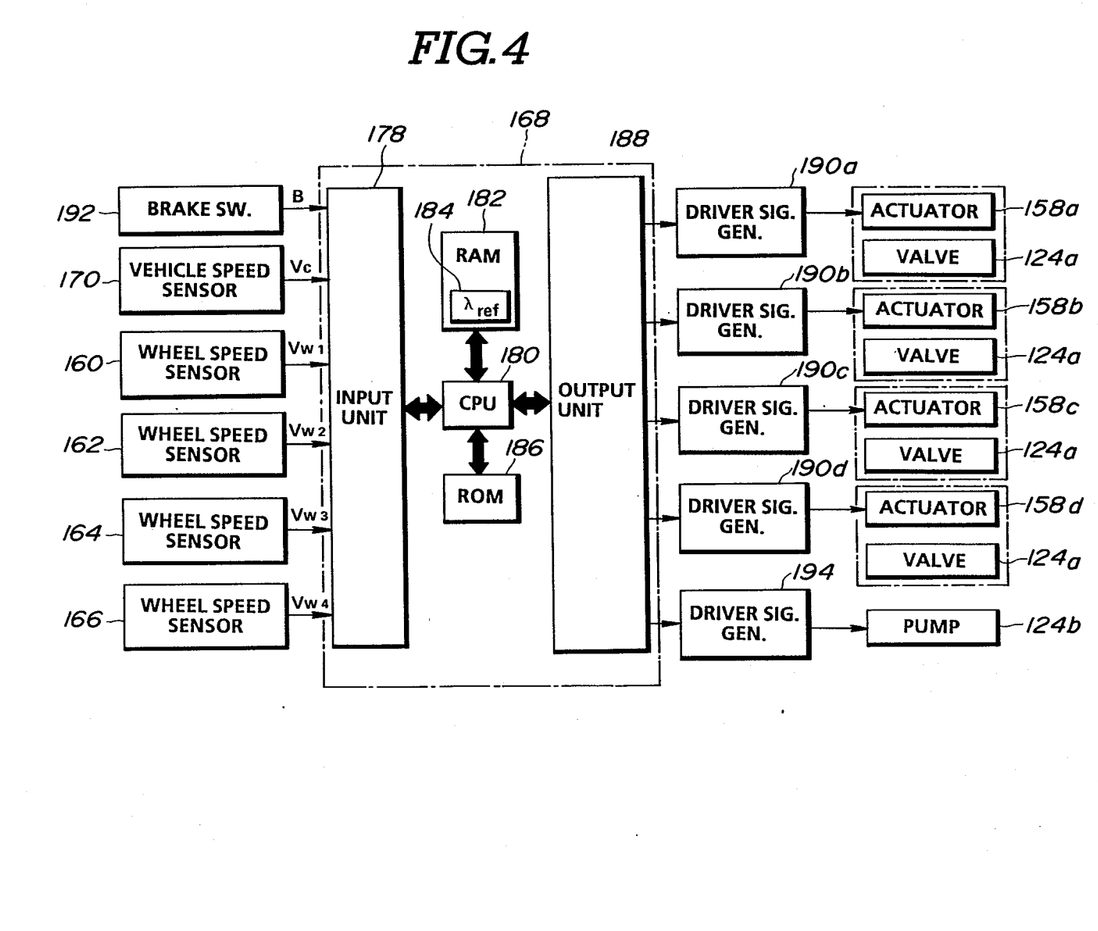
FIG. 4 is a block diagram of a control module to be employed in the anti-skid brake control system of FIG. 3.

The pressure control valve unit 124 includes four pressure control valves 124a, each of which is operable to perform anti-skid brake control operation for adjusting brake pressure in the corresponding one of the wheel cylinders, independently of the other. Therefore, the the pressure control valve unit 124 is associated with electrically or electromagnetically operable actuators 158 as shown in FIG. 4. Each of the actuators 158 is designed to operate the corresponding one of the pressure control valve 124a in the pressure control valve unit 124. Each actuator 158 is operative in the aforementioned APPLICATION mode, HOLD mode and RELEASE mode to operate the corresponding pressure control valve between APPLICATION, HOLD AND RELEASE mode positions. When the pressure control valve unit 124 is in APPLICATION mode position, the brake pressure built-up in the master cylinder 122 is introduced into the wheel cylinders 102, 104, 106 and 108 via the pressure control valve unit so as to increase the fluid pressure in the wheel cylinders essentially in proportion to the increasing of the hydraulic pressure in the master cylinder. On the other hand, when the pressure control valve unit 124 is held at a HOLD mode position, the pressure control valve unit 124 locks all of the pressure lines so as to maintain the brake pressure in the wheel cylinders 102, 104, 106 and 108 constant. When the pressure control valve unit 124 is set at the RELEASE mode position, the working fluid in the pressure lines 146, 148, 150 and 152 flows back to the pressure control valve and thus the brake pressure in the wheel cylinder is reduced.

In order to improve the response to order for reducing the brake pressure in the wheel cylinders, the pressure control valve unit 124 incorporates a drain pump 124b. The drain pump 124b may be operated in response to order for RELEASE mode operation to draw the working fluid in the wheel cylinders to a pressure accumulator (not shown) in the pressure control valve unit 124.

In order to perform the preferred process of the anti-skid brake control operation, wheel speed sensors 160, 162, 164 and 166 are provided for the respective front and rear wheels 110, 112, 114 and 116 for monitoring rotation speeds thereof. The wheel speed sensors 160, 162, 164 and 166 output wheel sensor signals $Vw_1$, $Vw_2$, $Vw_3$ and $Vw_4$. The wheel sensor signals $Vw_1$, $Vw_2$, $Vw_3$ and $Vw_4$ are fed to a control module 168. The control module 168 is also connected to a vehicle speed sensor 170.

In the preferred embodiment of the anti-skid brake control system of FIG. 3, a doppler radar is employed as the vehicle speed sensor 170 for monitoring the vehicle speed and producing a vehicle speed indicative signal Vc. The construction and operation of the doppler lasers to be used for monitoring the vehicular speed have been known per se. Therefore it should not be necessary to discuss the detail of such a doppler lader to be used in the shown embodiment. Although the shown embodiment of the anti-skid brake control system utilizes a vehicle speed sensor for monitoring the vehicle speed and inputting the vehicle speed indicative signal Vc to the control module 14, it would be possible to project the vehicle speed indicative value on the basis of the wheel speed indicative signal value Vw. Such process has already been disclosed in the U.S. Pat. Nos. 4,674,049 (issued on June 16, 1987), 4,663,715 (issued on May 5, 1987), 4,663,716 (issued on May 5, 1987), 4,660,146 (issued on Apr. 21, 1987), 4,665,491 (issued on May 12, 1987), 4,674,050 (issued on June 16, 1987), 4,680,714 (issued on July 14, 1987), 4,682,295 (issued on July 21, 1987), 4,680,713 (issued on July 14, 1987), 4,669,046 (issued on May 26, 1987), 4,669,045 (issued on May 26, 1987), 4,679,146 (issued on July 7, 1987, 4,656,588 (issued on Apr. 7, 1987), 4,569,560 (issued on Feb. 11, 1986), 4,662,686 (issued on May 5, 1987), 4,667,176 (issued on May 19, 1987), 4,597,052 (issued on June 24, 1986), 4,683,537 (issued on July 28, 1987), which are all assigned to the common assignee to the present invention. The disclosure of the above-lised U.S. Patents are herein incorporated for the sake of disclosure.

It should be appreciated that the shown embodiment of the anti-skid brake control system has been applied for a front-engine, rear wheel-drive type vehicle which has a power train including a propeller shaft 172, a differential gear box 174 and drive shafts 176 for transmitting driving torque to rear wheels.

As shown in FIG. 4, the control module 168 comprises a microprocessor based unit processing the brake control parameters, i.e the vehicle speed Vc, the wheel speeds Vw and so forth. The control module 168 comprises a microprocessor including an input unit 178, CPU 180, RAM 182 which includes a reference table 184 storing wheel slippage threshold $\lambda_{ref}$, ROM 186 and an output unit 188. The output unit 188 is connected to a drive signal generators 190a, 190b, 190c and 190d which generate driver signals for driving the actuators 158a, 158b, 158c and 158d and thereby operates the pressure control valve unit 124 at the desired mode position independently of each other.

The input unit 178 of the control module 168 is connected to the vehicle speed sensor 170 to receive the vehicle speed indicative sensor signal Vc, and to the wheel speed sensors 160, 162, 164 and 166 to receive the wheel speed indicative sensor signals $Vw_1$, $Vw_2$, $Vw_3$ and $Vw_4$. In addition, the input unit 178 is connected to a brake switch 192 to for detecting the vehicular braking state based on the signal therefrom. Namely, the brake switch 192 turns ON in response to the depression of the brake pedal 132 to input HIGH level signal to the control module 168 as a braking state indicative signal B.

On the other hand, the output unit 188 of the control module 168 is connected to another driver signal generator 194. The driver signal generator 194 is connected to the drain pump 124b to drive the latter while the pressure control valve unit 124 is in the RELEASE mode position. Though the drain pump 124b need be driven only in the RELEASE mode position of the pressure control valve unit 124, it may be possible to also drive the drain pump at the HOLD mode position of the pressure control valve unit. By driving the drain pump 124b even at the HOLD mode position, the response to the demand for reducing the brake pressure in the wheel cylinder can be improved.

Figure 5:
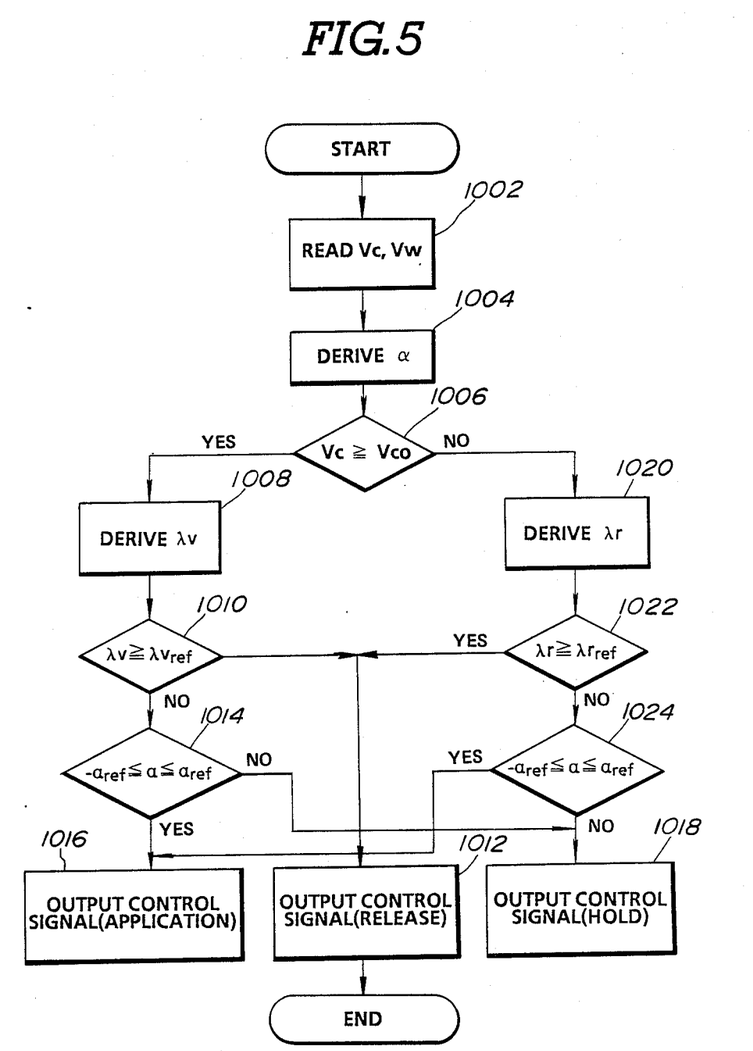
FIG. 5 is a flowchart of an anti-skid brake control program to be executed by the control module of FIG. 4.
Figure 6:
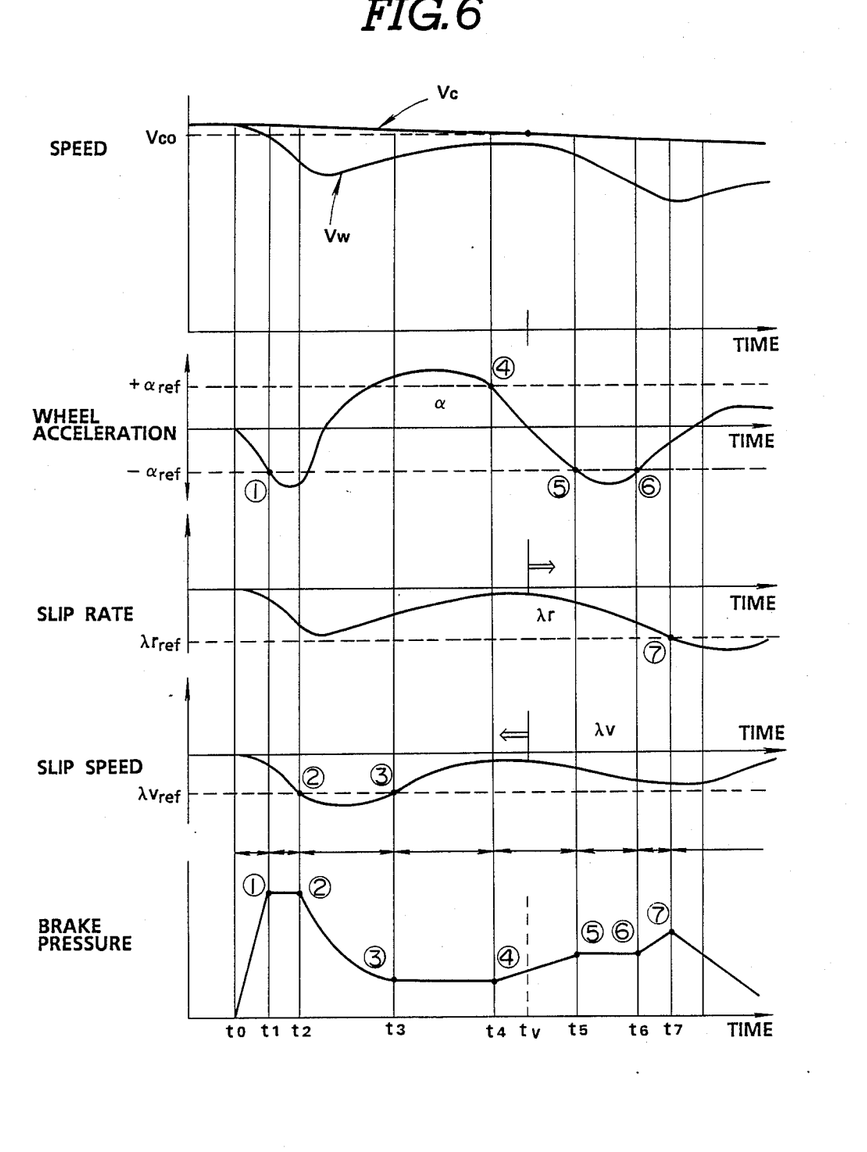
FIG. 6 is a timing chart showing operation of the preferred embodiment of the anti-skid brake control system of FIG. 3.

Operation of the aforementioned control module 168 will be discussed with reference to FIGS. 5 and 6. FIG. 5 shows a flowchart of the anti-skid brake control program and FIG. 6 shows the timing chart in the brake control operation. As will be appreciated, the anti-skid brake control program will be executed cyclically or periodically with a given interval, e.g. every 20 msec.

It should be appreciated through the control module performs independent anti-skid brake control for adjusting brake pressure in respective wheel cylinder so that the brake pressure in respective wheel cylinder can be adjusted independently of each other, the following disclosure will be given in terms of anti-skid control for one wheel cylinder, since control operations to be performed with respect to respective wheel cylinders are identical to each other. Therefore, it should be understood that the following discussion is applicable for anti-skid controlling respective wheel cylinders.

Immediately after starting the execution, all of the control parameters, i.e. the vehicle speed indicative sensor signal value Vc and the wheel speed indicative sensor signal value Vw are read out at a step 1002. At a step 1004, a wheel acceleration value $\alpha$ is derived on the basis of the variation of the wheel speed signal value Vw.

The wheel acceleration value $\alpha$ may be arithmetically derived by differentiating the wheel speed indicative signal values. The method of derivation of the wheel acceleration value $\alpha$ by differentiation has been disclosed in the U.S. Pat. No. 4,430,714, issued on Feb. 7, 1984. On the other hand, the wheel acceleration may be arithmetically derived by sampling wheel speed indicative sensor signal values Vw and driving the wheel acceleration value on the basis of the difference of the sampled values and the sampling interval. Such process has been disclosed in the U.S. Pat. No. 4,408,290, issued on Oct. 3, 1983. Also, the similar processes have been disclosed in the aforementioned U.S. Pat. Nos. 4,674,049, 4,663,715, 4,663,716, 4,660,146, 4,665,491, 4,674,050, 4,680,714, 4,682,295, 4,680,713, 4,669,046, 4,669,045, 4,679,146, 4,656,588, 4,569,560, 4,662,686, 4,667,176, 4,597,052, and 4,683,537. The disclosure of above-mentioned U.S. Patents are herein incorporated by reference for the sake of disclosure.

It should be noted that the wheel acceleration is held at a positive value while the wheel speed accelerates and is held at negative value while the wheel speed decelerates. Throughout the disclosure, the word wheel acceleration is used to represent both the wheel acceleration and deceleration (negative acceleration which has a negative acceleration value).

After the step 1004, the vehicle speed indicative sensor signal value Vc is compared with a vehicle speed threshold Vco which represents a vehicle speed criterion for changing the wheel slippage threshold value $\lambda_{ref}$ at a step 1006. As will be appreciated herefrom, the shown embodiment differentiates the wheel slippage threshold $\lambda_{ref}$ when the vehicle speed changes across the vehicle speed threshold Vco. When the vehicle speed is higher than or equal to the vehicle speed threshold Vco, process goes to a step 1008. In the step 1008, a wheel slip speed $\lambda v$ ($=Vc-Vw$) is derived on the basis of the vehicle speed indicative signal value vc and the wheel speed indicative signal value Vw. The derived wheel slip speed $\lambda v$ is compared with a slip speed threshold $\lambda v_{ref}$ stored in the reference table 184, at a step 1010. The slip speed threshold $\lambda v_{ref}$ is set at 10 km/h in the shown embodiment. If the derived slip speed $\lambda v$ is higher than or equal to the slip speed threshold $\lambda v_{ref}$, a control signal ordering the RELEASE mode is output at a step 1012.

On the other hand, when the derived slip speed $\lambda v$ is lower than the slip speed threshold $\lambda v_{ref}$, the wheel acceleration value $\alpha$ is checked as to whether it is within a predetermined wheel acceleration range, at a step 1014. The predetermined wheel acceleration range is defined by a given wheel deceleration threshold $-\alpha_{ref}$ and a given wheel acceleration threshold $\alpha_{ref}$. If the wheel acceleration value $\alpha$ is smaller than or equal to $-a_{re}$ and is greater than or equal to $\alpha_{ref}$, the process goes to a step 1016 to output the control signal ordering APPLICATION mode.

On the other hand, when the wheel acceleration value $\alpha$ is output the predetermined range, i.e. smaller than the deceleration threshold $-\alpha_{ref}$ or greater than the acceleration threshold $\alpha_{ref}$. Process goes to a step 1018 to output a control signal ordering the HOLD mode.

When the vehicle speed Vc is lower than the vehicle speed threshold Vco as checked at the step 1006, a wheel slip rate $\lambda r$ is derived at a step 1020. The wheel slip rate $\lambda r$ is calculated from the following equation:

$$\lambda r = (Vc - Vw)/Vc$$

The derived wheel slip rate $\lambda r$ is compared with a slip rate threshold $\lambda r_{ref}$ which is read from the reference table 184 at a step 1022. If the derived slip rate $\lambda r$ is greater than or equal to the slip rate threshold $\lambda r_{ref}$ as checked at the step 1022, the process goes to the step 1012 to output the control signal ordering the RELEASE mode. On the other hand, when the slip rate $\lambda r$ is smaller than the slip rate threshold $\lambda r_{ref}$, the wheel acceleration $\alpha$ is checked whether it is within a predetermined wheel acceleration range, at a step 1024. The predetermined wheel acceleration range is defined by a given wheel deceleration threshold $-\alpha_{ref}$ and a given wheel acceleration threshold $\alpha_{ref}$. If the wheel acceleration value $\alpha$ is smaller than or equal to $-\alpha_{ref}$ and is greater than or equal to $\alpha_{ref}$, the process goes to a step 1016 to output the control signal ordering APPLICATION mode.

On the other hand, when the wheel acceleration value $\alpha$ is output the predetermined range, i.e. smaller than the deceleration threshold $-\alpha_{ref}$ or greater than the acceleration threshold $\alpha_{ref}$, as checked at the step 1014. Process goes to a step 1018 to output a control signal ordering the HOLD mode.

The practical operation to control the brake pressure has been illustrated in FIG. 6. At a time $t_0$, the vehicular braking operation is initiated by depression of the brake pedal while the vehicle is running at a speed Vc higher than the vehicle speed threshold Vco. At this time, the pressure control valve 124a in the pressure control valve unit 124 is held at the APPLICATION mode position. Therefore, the brake pressure in the wheel cylinder increases according to the increasing of the fluid pressure in the master cylinder 122. By application of the brake, the vehicle is decelerated and the wheels are decelerated. Due to wheel slippage, the magnitude of deceleration of the wheel becomes greater than that of the vehicle. At the time, the wheel decelerated to increase the magnitude of negative value $(-\alpha)$ across the deceleration threshold $-\alpha_{ref}$. At a time $t_1$, the magnitude of the negative $\alpha$ value $(-\alpha)$ is increased across the $-$wheel deceleration threshold $-\alpha_{ref}$. Since the wheel acceleration value $\alpha$ changed to be out of the given range and the vehicle speed Vc is held higher than the vehicle speed threshold, the control module 168 outputs the control signal ordering the HOLD mode. By holding the brake pressure in the wheel cylinder constant at an increased level, the vehicle and wheels are maintained deceleration. During this period, due to presence of wheel slippage the difference of the vehicle speed indicative signal value Vc and the wheel speed indicative signal value Vw increases. As a result, the slip speed value $\lambda v$ increases across the slip speed threshold $\lambda v_{ref}$. At a time $t_2$, the slip speed $\lambda v$ increases across the slip speed threshold $\lambda v_{ref}$. This causes the control module to output the control signal ordering the RELEASE mode. As a result, the pressure control valve 124a of the pressure control valve unit 124 is operated to the RELEASE mode position to reduce the brake pressure in the wheel cylinder.

By maintaining the pressure control valve 124a at the RELEASE mode position, the wheel speed is resumed toward the vehicle speed. Therefore, the wheel is accelerated. The slip speed $\lambda v$ is then reduced across the slip speed threshold $\lambda v_{ref}$ at a time $t_3$. Then, the control module 168 again outputs the control signal ordering HOLD mode to hold the brake pressure in the wheel cylinder constant at the reduced pressure. The resumption of the wheel acceleration $\alpha$ terminates when the wheel speed reaches the vehicle speed. After this, since the brake pressure in the wheel cylinder is held constant but not zero, the wheel starts to decelerate. During this period, the magnitude of the wheel acceleration decreases across the wheel acceleration threshold $\alpha_{ref}$ at a time $t_4$. At this time, the wheel slip speed $\lambda v$ is reduced to be smaller than the slip speed threshold $\lambda v_{ref}$. This satisfies the condition that the wheel slip speed $\lambda v$ is smaller than the slip speed threshold $\lambda v_{ref}$ and wheel acceleration value $\alpha$ is within the given range, i.e. between the values $-\alpha_{ref}$ and $\alpha_{ref}$. Therefore, the control signal ordering APPLICATION mode is output from the control module 168. Therefore, brake pressure starts to be resumed after the time $t_4$.

The increasing of the brake pressure in the wheel cylinder causes deceleration of the vehicle across the vehicle speed threshold Vco at a time $t_v$. Then, the wheel slippage threshold $\alpha$ is switched from the wheel slip speed threshold $\lambda v_{ref}$ to wheel slip rate threshold $\lambda r_{ref}$. The wheel is also decelerated to increase the magnitude of the negative value of the wheel acceleration value $\alpha$ across the wheel deceleration threshold again, at a time $t_5$. Here, since the slip rate $\lambda r$ is held smaller than the slip rate threshold $\lambda r_{ref}$ and the negative value of the wheel acceleration $(-\alpha)$ is out of the given range, the control module 168 output the control signal ordering the HOLD mode. In the shown example of FIG. 6, by holding the brake pressure constant, the magnitude of the negative value of the wheel acceleration $(-\alpha)$ decreases across the wheel deceleration threshold $-\alpha_{ref}$ at s time $t_6$. This satisfies the condition for operating the brake system in the APPLICATION mode. Therefore, the control signal ordering the APPLICATION mode is output from the control module 168. By which slip rate $\lambda r$ increases across the slip rate threshold $\lambda r_{ref}$, at a time $t_7$, therefore the control signal ordering the RELEASE mode is output.

Though the shown embodiment uses the different type of wheel slippage thresholds, i.e. wheel slip speed threshold $\lambda v_{ref}$ and the wheel slip rate threshold $\lambda r_{ref}$, it would be possible to simply vary the same type of threshold, such as wheel slip speed or wheel slip rate, at a different value depending upon the vehicle speed. However, by employing the slip speed threshold $\lambda v_{ref}$, the wheel slippage threshold can be practically varied relative to the vehicle speed to differentiate the wheel slippage upon which the RELEASE mode brake control is performed. This allows for further species precise anti-skid brake control to optimize the braking efficiency or performance.

In addition, since the shown embodiment of the anti-skid brake control system employs proportioning valves between the pressure control valve and the rear wheel cylinders, locking of the rear wheels at earlier timing than that of the from wheels which brings the vehicle into unstable condition, can be successfully prevented.

What is claimed is:

1. An anti-skid brake control system comprising:
   a hydraulic brake circuit including a brake pressure source and a wheel cylinder for applying a hydraulic brake pressure for decelerating a wheel rotation, said brake circuit including a pressure control valve having a variable valve position between at least a first position, in which brake pressure is increased essentially according to an increasing of fluid pressure in said brake pressure source, and a second position, in which brake pressure is decreased;
   a first sensor means for monitoring a rotation speed of said wheel in order to produce a wheel speed indicative sensor signal;
   a second sensor means for monitoring vehicle speed in order to produce a vehicle speed indicative sensor signal;
   third means for deriving a wheel slippage threshold which is variable depending upon said vehicle speed indicative sensor signal value, said third means comparing said vehicle speed indicative sensor signal value with a predetermined vehicle speed threshold to vary said wheel slippage threshold at a first value which is a wheel slip rate, when said vehicle speed indicative sensor signal value is smaller than or equal to said vehicle speed threshold and at a second value which is a wheel slip speed when said vehicle speed indicative sensor signal value is greater than said vehicle speed threshold; and fourth means for deriving an actual wheel slippage indicative value on the basis of said vehicle speed indicative sensor signal value and said wheel speed indicative sensor signal value, said fourth means comparing the derived wheel slippage indicative value with said wheel slippage threshold for deriving a control signal for controlling said pressure control valve into said second position when said derived wheel slippage increases above said wheel slippage threshold.

2. An anti-skid brake control system comprising:

a hydraulic brake circuit including a brake pressure source and wheel cylinders for applying a hydraulic brake pressure for decelerating wheel rotation, said brake circuit including pressure control valve means having a variable valve position between at least a first position, in which brake pressure is increased essentially according to an increasing of fluid pressure in a brake pressure source, and a second position, in which brake pressure is decreased;

a first sensor means for monitoring a rotation speed of said wheel in order to produce a wheel speed indicative sensor signal;

a second sensor means for monitoring vehicle speed in order to produce a vehicle speed indicative sensor signal;

third means for deriving a wheel slippage threshold which is variable depending upon said vehicle speed indicative sensor signal value;

fourth means for deriving an actual wheel slippage indicative value on the basis of said vehicle speed indicative sensor signal value and said wheel speed indicative sensor signal value, said fourth means comparing the derived actual wheel slippage indicative value with said wheel slippage threshold for deriving a control signal for placing said pressure control valve into said second position when said derived wheel slippage increases above said wheel slippage threshold;

a plurality of mutually independent hydraulic circuits, each being connected to said brake pressure source and having a wheel cylinder and a pressure control valve; and a plurality of sensors monitoring rotation speeds of respectively corresponding wheels;

and wherein said fourth means performs anti-skid brake control by controlling valve positions of respective pressure control valves independently of each other.

3. An anti-skid brake control system for an automotive brake system comprising:

a hydraulic brake circuit including a brake pressure source and a wheel cylinder for applying a hydraulic brake pressure for decelerating a wheel rotation, said brake circuit including a pressure control valve having a variable valve position between at least a first position, in which brake pressure is increased essentially according to an increasing of fluid pressure in said brake pressure source, a second position, in which brake pressure is decreased and a third position, in which brake pressure in said wheel cylinder is held constant;

a first sensor means for monitoring a rotation speed of said wheel in order to produce a wheel speed indicative sensor signal;

a second sensor means for monitoring vehicle speed in order to produce a vehicle speed indicative sensor signal;

third means for deriving a wheel slippage threshold which is variable depending upon said vehicle speed indicative sensor signal value; and fourth means for deriving an actual wheel slippage indicative value on the basis of said vehicle speed indicative sensor signal value and said wheel speed indicative sensor signal value, and deriving a wheel acceleration value on the basis of said wheel speed indicative sensor signal value, said fourth means deriving position of said pressure control value on the basis of said wheel slippage indicative value and said wheel acceleration value, said fourth means deriving a control signal ordering a first mode for operating said pressure control valve at said first position when said derived wheel slippage indicative value is smaller than or equal to said wheel slippage threshold and said wheel acceleration is held within a given range defined by a lower criterion and an upper criterion, a second mode for operating said pressure control valve at said second position when said derived wheel slippage indicative value is greater than said wheel slippage threshold, and a third mode for operating said pressure control valve at said third position when said derived wheel slippage indicative value is smaller than or equal to said wheel slippage threshold and said wheel acceleration is out of said given range.

4. An anti-skid brake control system as set forth in claim 3, which comprises a plurality of mutually independent hydraulic circuits, each being connected to said brake pressure source and having said wheel cylinder and said pressure control valve, a plurality of said first sensor means for monitoring rotation speeds respectively corresponding wheels, and said fourth means performing anti-skid brake control by controlling valve positions of respective pressure control valves independently of each other.

5. An anti-skid brake control system as set forth in claim 4, wherein at least one of said hydraulic circuits is connected to wheel cylinders for applying braking pressure for rear wheels, and which further comprises a proportioning valve disposed within said hydraulic circuit connected to wheel cylinders of said rear wheels.

6. An anti-skid brake control system for an automotive brake system comprising:

a hydraulic brake circuit including a brake pressure source and a wheel cylinder for applying a hydraulic brake pressure for decelerating a wheel rotation, said brake circuit including a pressure control valve having a variable valve position between at least a first position, in which brake pressure is increased essentially according to an increasing of fluid pressure in said brake pressure source, a second position, in which said brake pressure is decreased and a third position, in which brake pressure in said wheel cylinder is held constant;

a first sensor means for monitoring a rotation speed of said wheel in order to produce a wheel speed indicative sensor signal;

a second sensor means for monitoring vehicle speed in order to produce a vehicle speed indicative sensor signal;

third means for deriving a wheel slippage threshold which is variable depending upon said vehicle speed indicative sensor signal value, said third means comparing said vehicle speed indicative sensor signal value with a predetermined vehicle speed threshold to vary said wheel slippage threshold at a first value which is a wheel slip rate, when said vehicle speed indicative sensor signal value is smaller than or equal to said vehicle speed threshold and at a second value which is a wheel slip speed when said vehicle speed indicative sensor signal value is greater than said vehicle speed threshold; and fourth means for deriving an actual wheel slippage indicative value on the basis of said vehicle speed indicative sensor signal value and said wheel speed indicative sensor signal value, and deriving a wheel acceleration value on the basis of said wheel speed indicative sensor signal value, said fourth means deriving a position of said pressure control value on the basis of said wheel slippage indicative value and said wheel acceleration value, said fourth means deriving a control signal ordering a first mode for operating said pressure control valve to said first position when said derived wheel slippage indicative value is smaller than or equal to said wheel slippage threshold and said wheel acceleration is held within a given range defined by a lower criterion and an upper criterion, a second mode for operating said pressure control valve at said second position when said derived wheel slippage indicative value is greater than said wheel slippage threshold, and a third mode for operating said pressure control valve at said third position when said derived wheel slippage indicative value is smaller than or equal to said wheel slippage threshold and said wheel acceleration is out of said given range.

7. An anti-skid brake control system as set forth in claim 6, wherein said third means compares said vehicle speed indicative sensor signal value with a predetermined vehicle speed threshold to vary said wheel slippage threshold at a first value when said vehicle speed indicative sensor signal value is smaller than or equal to said vehicle speed threshold and at a second value when said vehicle speed indicative sensor signal value is greater than said vehicle speed threshold.

8. An anti-skid brake control system as set forth in claim 7, wherein said first value represents greater wheel slippage criterion than that represented by said second value.

9. An anti-skid brake control system as set forth in claim 8, wherein said first value and said second value are different type of values.

10. An anti-skid brake control system as set forth in claim 9, wherein said first value is a wheel slip rate and said second value is a wheel slip speed.

11. An anti-skid brake control system for an automotive brake system comprising:

a hydraulic brake circuit including a brake pressure source and a wheel cylinder for applying a hydraulic brake pressure for decelerating a wheel rotation, said brake circuit including a pressure control valve having a variable valve position between at least a first position in which brake pressure is increased essentially according to an increasing of fluid pressure in said brake pressure source, a second position in which brake pressure is decreased, and a third position in which brake pressure in said wheel in order cylinder is held constant;

a first sensor means for monitoring a rotation speed of said wheel in order to produce a wheel speed indicative sensor signal;

a second sensor means for monitoring vehicle speed in order to produce a vehicle speed indicative sensor signal;

third means for deriving a wheel slippage threshold which is variable depending upon said vehicle speed indicative sensor signal value, said third means comparing said vehicle speed indicative sensor signal value with a predetermined vehicle speed threshold to vary said wheel slippage threshold at a first value when said vehicle speed indicative sensor signal value is smaller than or equal to said vehicle speed threshold and at a second value when said vehicle speed indicative sensor signal value is greater than said vehicle speed threshold; and fourth means for deriving a first wheel slippage representative data value on the basis of said vehicle speed indicative sensor signal value and said wheel speed indicative sensor signal value when a vehicle speed indicative signal value is greater than the predetermined vehicle speed threshold and a second wheel slippage representative data value when said vehicle speed indicative signal value is smaller than or equal to said predetermined vehicle speed threshold, and deriving a wheel acceleration value on the basis of said wheel speed indicative sensor signal value, said fourth means deriving a position of said pressure control valve on the basis of said wheel slippage indicative value and said wheel acceleration value;

said fourth means deriving a control signal ordering a first mode for operating said pressure control valve at said first position when said derived wheel slippage representative data value is smaller than or equal to said wheel slippage threshold and said wheel acceleration is held within a given range defined by a lower criterion and an upper criterion, a second mode for operating said pressure control valve at said second position when said derived wheel slippage representative data value is greater than said wheel slippage threshold, and a third mode for operating said pressure control valve at said third position when said derived wheel slippage representative data value is smaller than or equal to said wheel slippage threshold and said wheel acceleration is out of said given range.

12. An anti-skid brake control system comprising:

a hydraulic brake circuit including a brake pressure source and a wheel cylinder to apply a hydraulic brake pressure for decelerating a wheel rotation, said brake circuit including a pressure control valve having a variable valve position at least between a first position, in which brake pressure is increased essentially according to increasing fluid pressure in said brake pressure source, and a second position, in which brake pressure is decreased;

a first sensor means for monitoring a rotation speed of a wheel to produce a wheel speed indicative sensor signal;

a second sensor means for monitoring a speed of a vehicle to produce a vehicle speed indicative sensor signal value;

third means for deriving a wheel slippage threshold which is variable depending upon said vehicle speed indicative signal value so that said wheel slippage is of a first nature when said vehicle speed indicative sensor signal value is smaller than or equal to a vehicle speed criterion, and of a second nature when said vehicle speed indicative signal value is greater than said vehicle speed criterion; and fourth means for deriving an actual wheel slippage indicative value on the basis of said vehicle speed indicative sensor signal value and said wheel speed indicative sensor signal value, said fourth means comparing a derived wheel slippage indicative value with said wheel slippage threshold to derive a control signal for operating said pressure control valve at said first position when said derived wheel slippage indicative value is smaller than or equal to said wheel slippage threshold and at said second position when said derived wheel slippage indicative value is greater than said wheel slippage threshold.

13. An anti-skid brake control system comprising:

a hydraulic brake circuit including a brake pressure source and a wheel cylinder to apply a hydraulic brake pressure for decelerating a wheel rotation, said brake circuit including a pressure control valve having a variable valve position at least between a first position, in which brake pressure is increased essentially according to increasing fluid pressure in said brake pressure source, and a second position, in which brake pressure decreased;

a first sensor means for monitoring a rotation speed of a wheel to produce a wheel speed indicative sensor signal;

a second sensor means for monitoring a speed of a vehicle to produce a vehicle speed indicative sensor signal value;

third means for deriving a wheel slippage threshold which is variable depending upon said vehicle speed indicative sensor signal value so that said wheel slippage threshold is derived on the basis of a wheel slippage rate when said vehicle speed indicative sensor signal value is smaller than or equal to a vehicle speed criterion, and on the basis of a wheel slippage speed when said vehicle speed indicative sensor signal value is greater than said vehicle speed criterion; and fourth means for deriving an actual wheel slippage indicative value on the basis of said vehicle speed indicative sensor signal value and said wheel speed indicative sensor signal, said fourth means comparing a derived wheel slippage indicative value with said wheel slippage threshold to derive a control signal for operating said pressure control valve at said first position when said derived wheel slippage indicative value is smaller than or equal to said wheel slippage threshold and at said second position when said derived wheel slippage indicative value is greater than said wheel slippage threshold.

14. An anti-skid brake control system comprising:

a hydraulic brake circuit including a brake pressure source and a wheel cylinder to apply a hydraulic brake pressure for decelerating a wheel rotation, said brake circuit including a pressure control valve having a variable valve position at least between a first position, in which brake pressure is increased essentially according to increasing fluid pressure in said brake pressure source, and a second position, in which brake pressure is decreased;

a first sensor means for monitoring a rotation speed of a wheel to produce a wheel speed indicative sensor signal;

a second sensor means for monitoring a speed of a vehicle to produce a vehicle speed indicative sensor signal value;

third means for deriving a wheel slippage threshold which is variable depending upon said vehicle speed indicative sensor signal value;

fourth means for deriving an actual wheel slippage indicative value on the basis of said vehicle speed indicative sensor signal value and said wheel speed indicative sensor signal, said fourth means comparing said vehicle speed indicative sensor signal value with a predetermined vehicle speed criterion to derive a wheel slippage value from a wheel slippage rate when said vehicle speed indicative sensor signal value is smaller than or equal to said vehicle speed criterion and to derive said wheel slippage value from a wheel slippage speed when said vehicle speed indicative sensor signal value is greater than a vehicle speed threshold; and means for comparing a derived wheel slippage value with said wheel slippage threshold to derive a control signal for operating said pressure control valve at said first position when a derived wheel slippage indicative value is smaller than or equal to said wheel slippage threshold and at said second position when said derived wheel slippage indicative value is greater than said wheel slippage threshold.

15. An anti-skid brake control system comprising:

a hydraulic brake circuit including a brake pressure source and a wheel cylinder to apply a hydraulic brake pressure for decelerating a wheel rotation, said brake circuit including a pressure control valve having a variable valve position at least between a first position, in which brake pressure is increased essentially according to increasing fluid pressure in said brake pressure source, and a second position, in which brake pressure is decreased;

a first sensor means for monitoring a rotation speed of a wheel to produce a wheel speed indicative sensor signal;

a second sensor means for monitoring a speed of a vehicle to produce a vehicle speed indicative sensor signal value;

third means for deriving a wheel slippage threshold which is variable depending upon said vehicle speed indicative sensor signal value; and fourth means for deriving an actual wheel slippage indicative value on the basis of said vehicle speed indicative sensor signal value and said wheel speed indicative sensor signal said fourth means comparing said vehicle speed indicative sensor signal value with a predetermined vehicle speed criterion to derive a wheel slippage value from a wheel slippage rate when said vehicle speed indicative sensor signal value is smaller than or equal to said vehicle speed criterion and to derive said wheel slippage value from a wheel slippage speed when said vehicle speed indicative sensor signal value is greater than said vehicle speed threshold, said fourth means including means for deriving a value on the basis of said wheel speed indicative sensor signal value, and a pressure control means for deriving a position of said pressure control valve on the basis of said wheel slippage indicative value and a wheel acceleration value, said pressure control means deriving a control signal ordering said pressure control valve to said first position, when a derived wheel slippage indicative value is smaller than or equal to said wheel slippage threshold and said wheel acceleration is held within a given range defined by a lower criterion and an upper criterion, said pressure control valve to said second position when said derived wheel slippage indicative value is greater than said wheel slippage threshold, and said pressure control valve to a third position when said derived wheel slippage indicative value is smaller than or equal to said wheel slippage threshold and said wheel acceleration is outside of said given range.

* * * * *